US009100803B2

(12) United States Patent
Rogan

(10) Patent No.: US 9,100,803 B2
(45) Date of Patent: Aug. 4, 2015

(54) METHODS AND SYSTEMS FOR SUBSCRIBER IDENTITY MANAGEMENT IN A MOBILE DEVICE

(75) Inventor: Michael John Rogan, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 219 days.

(21) Appl. No.: 13/491,675

(22) Filed: Jun. 8, 2012

(65) Prior Publication Data

US 2013/0331096 A1 Dec. 12, 2013

(51) Int. Cl.
*H04W 4/00* (2009.01)
*H04W 8/12* (2009.01)
*H04W 8/18* (2009.01)

(52) U.S. Cl.
CPC ................ *H04W 8/12* (2013.01); *H04W 8/183* (2013.01)

(58) Field of Classification Search
CPC ........ H04W 8/12; H04W 60/00; H04W 8/183
USPC .................. 455/432.1–435.3, 558, 410–411, 455/418–420
See application file for complete search history.

(56) References Cited

U.S. PATENT DOCUMENTS 6,052,604 A 4/2000 Bishop et al.
6,879,825 B1 4/2005 Daly
7,266,371 B1 9/2007 Amin et al.
7,912,497 B2 3/2011 Isisdore et al.
8,145,212 B2 3/2012 Lopresti et al.
2002/0006808 A1* 1/2002 Onaka et al. .................. 455/550
2004/0192306 A1 9/2004 Elkarat et al.
2005/0037755 A1* 2/2005 Hind et al. ................. 455/435.3
2006/0205434 A1* 9/2006 Tom et al. ..................... 455/558
2007/0049269 A1 3/2007 Ophir et al.
2010/0273462 A1 10/2010 Thorn et al.

(Continued)

FOREIGN PATENT DOCUMENTS

EP 1 703 760 9/2006
EP 1 727 383 11/2006

(Continued)

OTHER PUBLICATIONS

"iPhone 5 Design: Unlock Impossible as Apple Prepares Custom SIM for Next-gen Smartphones?" retrieved from http://nexus404.com/Blog/2010/10/27/iphone-5-design-unlock-impossible-as-apple-prepares-custom-sim-for-next-gen-smartphones-apple-rumored-to-bypass-carriers-with-own-custom-pre-loaded-iphone-sim-card-will-it-prevent-unlocking-too/ on May 2, 2012.
"iPhone 5 Programmable SIM Card: T-Mobile Liked The Idea" retrieved from http://nexus404.com/Blog/2010/11/24/iphone-5-programmable-sim-card-t-mobile-liked-the-idea-despite-being-shot-down-by-the-carriers-t-mobile-was-interested-in-listening-to-apples-idea/ on May 2, 2012.

(Continued)

*Primary Examiner* — Sharad Rampuria
(74) *Attorney, Agent, or Firm* — Integral Intellectual Property Inc.; Miriam Paton; Amy Scouten

(57) ABSTRACT

Methods and systems for managing a pool of subscriber identities, and wirelessly provisioning mobile devices to use one or more of the subscriber identities when a subscriber is roaming on a different network. When a subscriber's mobile device connects to a visited network, a subscriber identity server can be notified. The subscriber identity server may have access to a plurality of available subscriber identities (e.g., registered to various service providers), and may select a suitable subscriber identity matching the subscriber's visited network. The subscriber identity can be communicated to the subscriber's mobile device, which can be reprogrammed to assume the new subscriber identity.

20 Claims, 9 Drawing Sheets

412
414
416
410
100
400C

(56) References Cited

U.S. PATENT DOCUMENTS

| | | | | |
|---|---|---|---|---|
| 2011/0053580 | A1 | 3/2011 | Gutierrez et al. | |
| 2011/0194553 | A1 | 8/2011 | Sahin et al. | |
| 2012/0282891 | A1 * | 11/2012 | Mohammed et al. | 455/406 |
| 2012/0282924 | A1 * | 11/2012 | Tagg et al. | 455/432.1 |

FOREIGN PATENT DOCUMENTS

| | | |
|---|---|---|
| GB | 2 473 753 | 3/2011 |
| WO | 03/009623 | 1/2003 |
| WO | 2011/136764 | 11/2011 |

OTHER PUBLICATIONS

Document related to CA Patent Application No. 2,815,310, dated Dec. 2, 2014 (Office Action).

Document relating to EP Application No. 12171282.2, dated Jan. 13, 2013 (European Search Report).

Document relating to EP Application No. 12171282.2, dated Dec. 16, 2013 (Communication Pursuant to Rules 70(2) and 70a(2)).

Document relating to EP Application No. 12171282.2, dated May 1, 2014 (Request for Withdrawal).

* cited by examiner

METHODS AND SYSTEMS FOR SUBSCRIBER IDENTITY MANAGEMENT IN A MOBILE DEVICE

FIELD

The various embodiments described herein relate generally to subscriber identity management in mobile devices and, in particular, to subscriber identity management based on device location.

INTRODUCTION

To obtain wireless communication service, subscribers typically register an account with a wireless network service provider. A subscriber account is typically associated with a unique subscriber identity and, if the service is a telephone service, a telephone number. The unique subscriber identity and telephone number are typically recorded in a database by the service provider. In the Global System for Mobile Communications (GSM) protocol, the unique subscriber identity is known as an International Mobile Subscriber Identity (IMSI).

The IMSI is typically a 15-digit number, although it can have a different length in some implementations. The first 3 digits of the IMSI specify the Mobile Country Code (MCC) associated with the subscriber identity. The next 2 or 3 digits specify the Mobile Network Code (MNC) of the subscriber's service provider. The remaining digits comprise the Mobile Subscription Identification Number (MSIN) associated with the subscriber. The ITU E.212 numbering standard is commonly used for the IMSI. Each IMSI is generally unique to each service provider, and is thereby globally unique by virtue of incorporating the MCC and MNC.

The combination of the MCC and MNC is also referred to as the Home Network Identity (HNI), which identifies the subscriber's home network. The network may also be referred to as a Public Land Mobile Network (PLMN).

Typically, the IMSI of each registered subscriber is permanently stored in a Home Location Register (HLR) operated by the service provider. Each service provider generally operates at least one HLR to service its network. A subscriber's "home network" is generally the network served by the same provider's HLR that permanently stores the subscriber's IMSI.

For regulatory and other reasons, wireless network service providers typically operate wireless networks within a limited geographic area. However, subscribers often desire to maintain wireless network service when travelling outside the geographic area serviced by their home network. For this reason, a subscriber's wireless network service provider will generally have reciprocal agreements with other service providers to provide access while the subscriber is outside his or her home network.

The ability of a subscriber to automatically make use of network services outside the subscriber's home network is commonly referred to as roaming. Roaming allows a subscriber and, more particularly, the subscriber's mobile device, to access a "visited" network (i.e., a network accessed through the use of roaming), that is, a wireless network other than the subscriber's home network. In GSM, the GSM Association Permanent Reference Document AA.39 defines the services supported for a user while roaming: the ability to make and receive voice calls, send and receive data, and access other services, including home data services, when travelling outside the geographical coverage area of the home network.

DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF VARIOUS EMBODIMENTS

Figure 1:
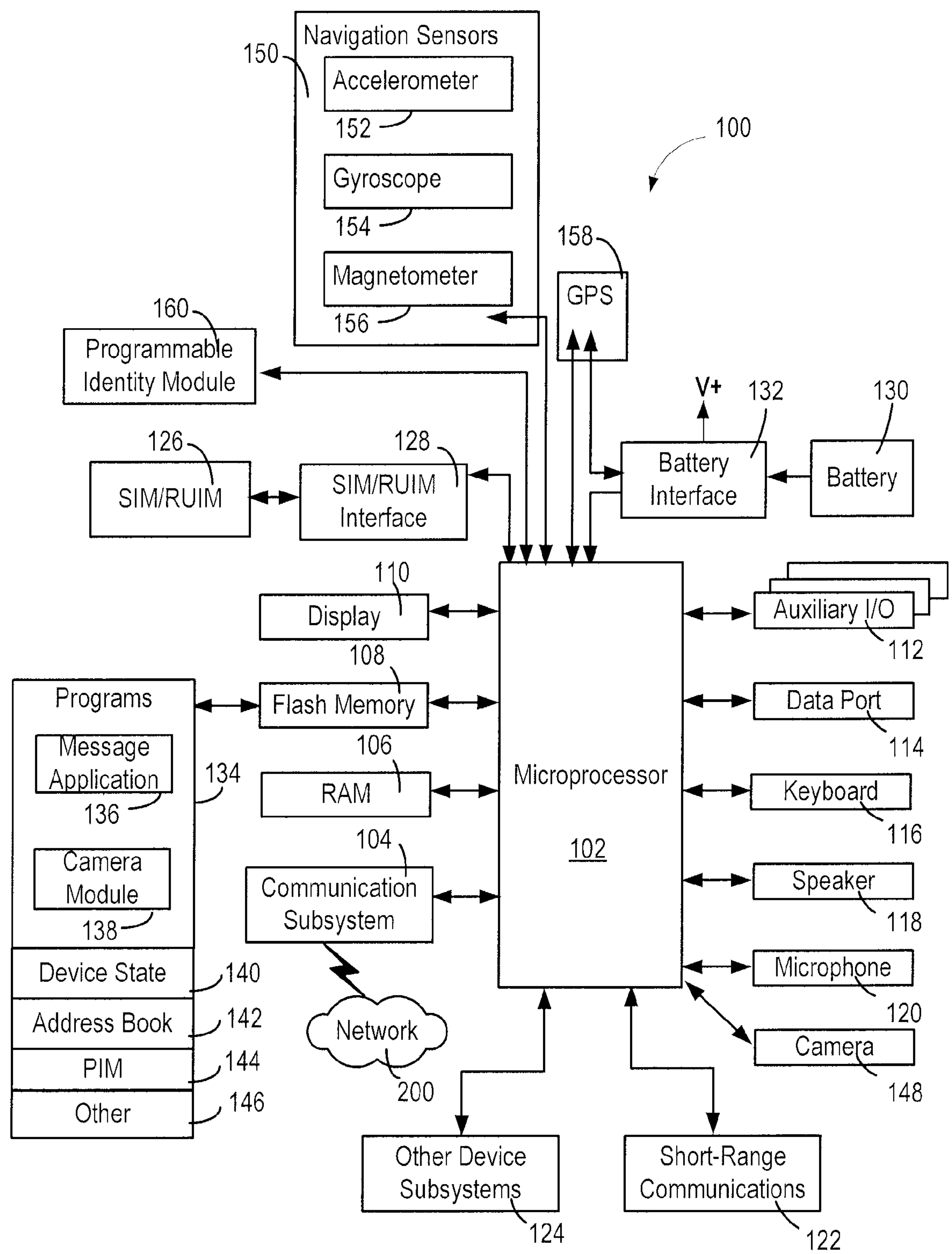
FIG. 1 is a block diagram of a mobile device in one example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the description of various embodiments herein. Also, the description is not to be considered as limiting the scope of the embodiments described herein. It should also be noted that the term coupled indicates that two elements can be directly coupled to one another or coupled to one another through one or more intermediate elements.

In a broad aspect, there is provided a method for managing subscriber identities on a mobile device, wherein the mobile device has a primary subscriber identity associated therewith, and wherein a first home zone is associated with the primary subscriber identity, the method comprising: wirelessly receiving a temporary subscriber identity from a subscriber identity server, wherein the temporary subscriber identity has a second home zone associated therewith, and wherein the second home zone corresponds to a current location of the mobile device; storing the temporary subscriber identity in a memory of the mobile device; and initializing the mobile device to use the temporary subscriber identity.

In another broad aspect, the storing comprises replacing the primary subscriber identity in the memory with the temporary subscriber identity.

In another broad aspect, the method further comprises, prior to receiving the temporary subscriber identity, determining the current location of the mobile device; detecting that the current location is in a visited zone other than the first home zone; and in response to the detecting, transmitting a temporary identity request to the subscriber identity server, the temporary identity request comprising an indication of the current location.

In some cases, the first home zone is a home network associated with the primary subscriber identity. In some cases, the second home zone is a home network associated with the temporary subscriber identity. In some cases, the visited zone is a visited network for the primary subscriber identity. In some cases, the first home zone is a local location area associated with the primary subscriber identity. In some cases, the second home zone is a local location area associated with the temporary subscriber identity. In some cases, the visited zone is a non-local location area for the primary subscriber identity.

In another broad aspect, the current location is determined based on one or more properties of the visited zone. In some cases, the one or more properties comprise a Location Area Identity of the visited zone. In some cases, the current location is determined using a wireless location service.

In another broad aspect, the method further comprises, prior to initializing the mobile device to use the temporary subscriber identity, transmitting a request to a host system to forward communications addressed to the primary subscriber identity to the temporary subscriber identity.

In another broad aspect, the method further comprises: determining that the current location of the mobile device has changed from a previous zone to a new zone; detecting that the new zone is the first home zone; transmitting a release request to the subscriber identity server to release the temporary subscriber identity; and re-initializing the mobile device to use the primary subscriber identity. In some cases, the re-initializing comprises replacing the temporary subscriber identity in the memory with the primary subscriber identity.

In some cases, the memory is a programmable subscriber identity module provided on the mobile device. In some cases, the programmable subscriber identity module is configured to store a plurality of identities.

In another broad aspect, there is provided a method for managing identity of a mobile device at a subscriber identity server, wherein the mobile device has a primary subscriber identity associated therewith, and wherein a first home zone is associated with the primary subscriber identity, the method comprising: determining that the mobile device is connected to a wireless network in a visited zone other than the first home zone; selecting a temporary subscriber identity from a plurality of available identities, wherein the selected temporary subscriber identity has a second home zone associated therewith, and wherein the second home zone corresponds to a current location of the mobile device; and transmitting the selected temporary subscriber identity to the mobile device.

In another broad aspect, the determining comprises receiving a temporary identity request from the mobile device, the temporary identity request comprising an indication of the current location of the mobile device.

In another broad aspect, the determining comprises receiving a notification that the mobile device has connected to the wireless network in the visited zone.

In another broad aspect, the method further comprises transmitting a request to a host system to forward communications addressed to the primary subscriber identity to the temporary subscriber identity.

In another broad aspect, the method further comprises updating a database to indicate that the temporary subscriber identity has been assigned to the mobile device.

In another broad aspect, the method further comprises: receiving a further notification that the mobile device has changed location; and updating the database to indicate that the temporary subscriber identity is no longer assigned to the mobile device.

In some cases, the first home zone is a home network associated with the primary subscriber identity. In some cases, the second home zone is a home network associated with the temporary subscriber identity. In some cases, the visited zone is a visited network for the primary subscriber identity. In some cases, the first home zone is a local location area associated with the primary subscriber identity. In some cases, the second home zone is a local location area associated with the temporary subscriber identity. In some cases, the visited zone is a non-local location area for the primary subscriber identity.

In another broad aspect, there is provided a mobile device, wherein a primary subscriber identity is associated the mobile device, and wherein a first home zone is associated with the primary subscriber identity, the mobile device comprising: a memory; a communication subsystem, and a processor configured to carry out the methods described herein.

In another broad aspect, there is provided an apparatus for managing identity of a mobile device, wherein the mobile device has a primary subscriber identity associated therewith, and wherein a first home zone is associated with the primary subscriber identity, the apparatus comprising: a database and a processor configured to carry out the methods described herein.

To aid the reader in understanding the structure of an example implementation of a mobile device, reference will be made to FIGS. 1 to 3. However, it should be understood that the embodiments described herein are not limited to a mobile device but can be extended to any electronic device that includes an image sensor and at least one navigational sensor. Examples of such electronic devices may include any portable electronic device such as cellular phones, cellular smartphones, wireless organizers, personal digital assistants, computers, laptops, handheld wireless communication devices, wireless enabled notebook computers, tablet computers or e-readers, electronic security devices, wireless Internet appliances and the like. The electronic devices listed herein which are mobile are generally portable and thus are battery-powered and may have limited processing power. While some of these devices include wireless communication capability, others are standalone devices that do not communicate with other devices.

Referring to FIG. 1, shown therein is a block diagram of one example of a mobile device 100. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. In other embodiments, the communication subsystem 104 can be configured in accordance with other communication standards as described below. New standards are still being defined, and it will be understood by persons skilled in the art that the various embodiments described herein should be able to be adapted to work with any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit-switched voice communications and packet-switched data communications.

Although the wireless network 200 associated with the mobile device 100 is a GSM/GPRS wireless network in this example, the mobile device 100 can be adapted to use other wireless networks in variant embodiments. For example, the different types of wireless networks that can be employed include, but are not limited to, data-centric wireless networks, voice-centric wireless networks, and dual-mode networks that can support both voice and data communications over the same physical base stations. Examples of networks also include, but are not limited to, Code Division Multiple Access (CDMA), CDMA2000 networks, GSM/GPRS networks, 3G networks like EDGE, W-CDMA and UMTS, 4G/LTE networks and future technologies such as 5G networks. Some other examples of data-centric networks include WiFi 802.11, Mobitex™ and DataTAC™ network communication systems. Examples of voice-centric data networks include Personal Communication Systems (PCS) networks like GSM and Time Division Multiple Access (TDMA) systems. Examples of communication protocols/standards that the mobile device 100 can be adapted to be used with include, but are not limited to, 3GPP and 3GPP2, High-Speed Packet Access (HSPA) standards such as High-Speed Downlink Packet Access (HSDPA), 3GPP LTE, LTE, LTE Advanced, WiMax, and Flash-OFDM.

The microprocessor 102 may also interact with additional subsystems such as, for example, a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a non-volatile memory (e.g., ROM, NVRAM, etc.) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after network registration or activation procedures have been completed. Network access may be associated with a subscriber or user of the mobile device 100. To identify a subscriber, the mobile device 100 may use a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 may not be fully operational for communication with the wireless network 200. By inserting the SIM card/RUIM 126 into the SIM/RUIM interface 128, a subscriber can access all subscribed services. Services may include, for example: web browsing and messaging such as e-mail, voice mail, SMS, and MMS. More advanced services may include, for example: point of sale, field service and sales force automation. The SIM card/RUIM 126 typically includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as the IMSI, which collectively comprise a subscriber identity that can be used to access wireless network services to which the subscriber is subscribed. Examples of subscriber information that may form the subscriber identity include the IMSI, Mobile Subscriber Integrated Services Digital Network (MSISDN) Number, and authentication key associated with a subscriber. In other embodiments, the subscriber identity may comprise other information, such as the International Mobile Equipment Identity (IMEI) of a mobile device.

An advantage of using the SIM card/RUIM 126 is that a subscriber is not necessarily bound to any single physical mobile device, as the SIM/RUIM 126 itself stores the subscriber identity, and can be removed and used in another mobile device. Likewise, a different SIM card/RUIM 126 can be used in place of the current SIM/RUIM 126 in a mobile device.

The SIM card/RUIM 126 can also store additional subscriber information for a mobile device as well, including datebook (or calendar) information and recent call information. Alternatively, user identification information can also be programmed into a memory, such as the flash memory 108.

In some cases, the SIM/RUIM 126 may be programmable. Accordingly, microprocessor 102 may be able to change the IMSI and other user parameters of the SIM/RUIM 126.

In some cases, the SIM/RUIM interface 128 may comprise two or more interfaces, to facilitate support of two or more SIM/RUIM 126. For example, the mobile device may accept two physical SIM cards simultaneously, and provide a user interface for selecting between the two.

Alternatively, or in addition, the mobile device may comprise a programmable identity module 160 that duplicates some or all of the functionality of the SIM/RUIM 126 (e.g., IMSI, MSISDN and authentication key storage), in which case the IMSI and other user parameters may be stored in a memory, for example flash memory 108.

In some cases, SIM/RUIM 126 may store a plurality of mobile network codes (MNCs) or network identifiers, which can be defined by the subscriber's service provider to indicate preferred networks that may be accessed for the purposes of roaming. In this way, when the subscriber is outside the home network and has access to a plurality of possible visited networks, a preferred network can be selected first.

Each SIM/RUIM 126 may have an authentication key (Ki) assigned to it by a service provider when the SIM/RUIM is first "personalized". The authentication key is a 128-bit value used to authenticate the SIM/RUIM on a mobile network. Each SIM/RUIM holds a unique Ki assigned to it by the operator during the personalization process. The authentication key is also stored in a database by the service provider and may be associated with a subscriber or the subscriber's IMSI.

Generally, the SIM/RUIM 126 may be designed to prevent access to the authentication key via the conventional smart card interface of the SIM/RUIM. In order to use the authentication key, data may be input to the smart card and the smart card can be instructed to perform a cryptographic signing function using the authentication key and the data. The requirement for both the authentication key and the IMSI to authenticate a subscriber on a wireless network can provide a measure of security, by ensuring that the SIM/RUIM is present to perform authentication functions.

However, in some cases, the service provider may reveal the authentication key, allowing the SIM/RUIM data to be duplicated or copied. In other cases, the authentication key can be extracted from the SIM/RUIM, for example by exploiting vulnerabilities in the cryptographic algorithms used by the SIM/RUIM.

The SIM/RUIM may also store network state information, including a current or last-known Location Area Identity (LAI) number. In some cases, when a mobile device enters a new location, it may store the LAI of the new location (e.g., in the SIM/RUIM) and transmit the LAI to the network to identify its current location.

The mobile device 100 is typically a battery-powered device and includes a battery interface 132 and may use one or more rechargeable batteries in a battery unit 130. The battery interface 132 may be coupled to a regulator (not shown), which assists the battery unit 130 in providing power V+ to the mobile device 100. Alternatively, the battery unit 130 can be a smart battery as is known in the art. Smart batteries generally include a battery processor, battery memory, switching and protection circuitry, measurement circuitry and a battery pack that includes one or more batteries, which are generally rechargeable. In either case, the one or more batteries in the battery unit 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of acts according to the methods specified by the code of the software applications 134.

The software applications 134 may include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. Alternatively, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. As a further alternative, all messages can be stored in a remote location while only recent messages can be stored on the mobile device 100.

The mobile device 100 may include, for example, a camera module 138, a device state module 140, an address book 142, a Personal Information Manager (PIM) 144, and other modules 146. The camera module 138 is used to control the camera operation for the mobile device 100, which includes obtaining raw thumbnail image data associated with images taken by an image sensor of the mobile device 100, preprocessing the raw thumbnail image data, and displaying the processed thumbnail image data on the display 110.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication may include, for example, standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, may also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 may include a camera unit 148 that allows a user of the mobile device 100 to capture images and videos. The camera unit 148 can include a camera controller, a current drive unit, a camera lens sub-unit, a camera flash sub-unit, a camera sensor sub-unit and an image capture input (not shown). The camera controller configures the operation of the camera unit in conjunction with information and instructions received from the microprocessor 102 and the camera module 138.

Mobile device 100 may further comprise a navigational sensor unit 150, which may comprise one or more navigational sensors, such as a gyroscope 154, accelerometer 152, and a magnetometer 156. Memory 108 may store calibration parameters or sensor data associated with one or more of the navigational sensors. In some other embodiments, navigational sensor unit 150 may comprise or have access to additional memory (not shown) internal to the navigational sensor unit 150.

Accelerometer 152 is a non-magnetometer sensor operable to obtain or otherwise acquire data such as data measuring the acceleration of an inertial reference frame relative to the accelerometer. Such data can be stored in a data store, such as memory 108. Gyroscope 154 is a non-magnetometer sensor operable to obtain or otherwise acquire data such as data measuring the orientation of mobile device 100 relative to one or more axes. Such data can be stored in a data store, such as memory 108. Magnetometer 156 is operable to obtain or otherwise acquire data such as data measuring the direction of a magnetic field and its strength. In some cases, magnetometer 156 may provide data representing properties of a three-dimensional magnetic field. For example, the data may comprise a magnetic field vector, comprising a scalar magnitude and angular values (e.g., bearing, azimuth, inclination). Such data can be stored in a data store, such as memory 108.

In some embodiments, a Global Positioning System (GPS) unit 158 may also be provided on mobile device 100. GPS unit 158 is operable to obtain or otherwise acquire position data such as, for example, longitude, latitude and elevation using a global navigation satellite system such as the Global Positioning System, Galileo, GLONASS or the like. Such data can be stored in a data store, such as memory 108. Various applications may utilize the stored GPS unit data.

Navigation sensor unit 150 may provide a data communication interface enabling data communication with microprocessor 102 and various other subsystems of mobile device 100.

Figure 2:
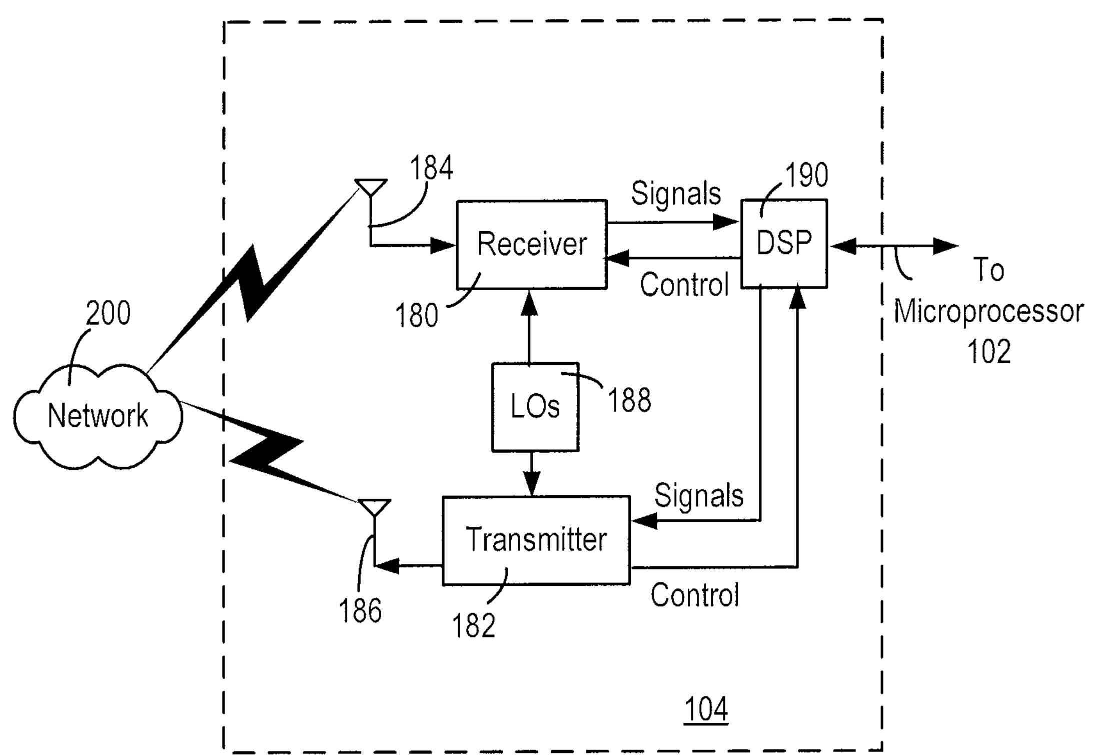
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which the mobile device 100 is intended to operate; thus, it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication techniques such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
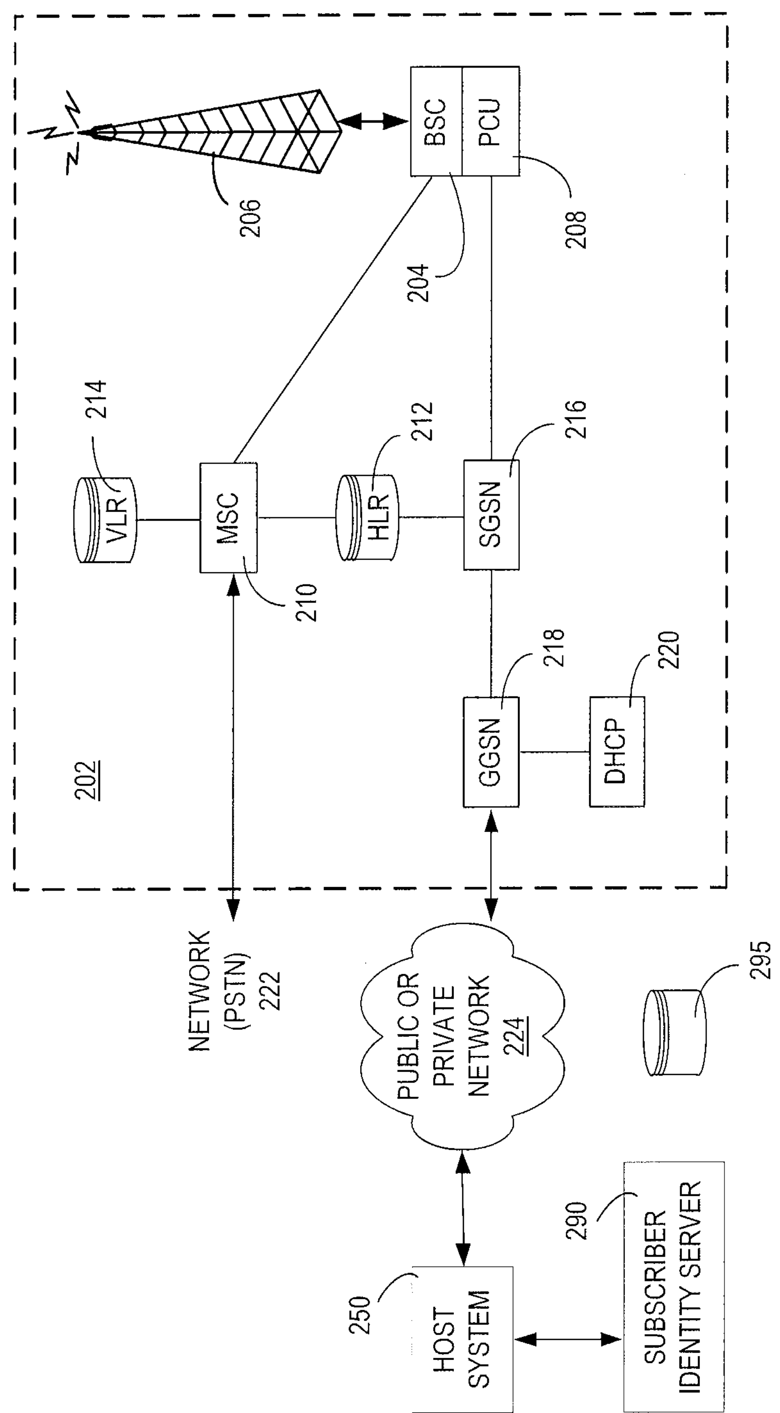
FIG. 3 is a block diagram of a node of a wireless network in one example embodiment.

Referring now to FIG. 3, a block diagram of a node of a wireless network is shown as 202. In this example embodiment, the network and its components are described for operation with GPRS and GSM technologies. However, it should be understood that in other embodiments the network can be implemented in accordance with other communication protocols. In practice, the network 200 comprises one or more nodes 202. The mobile device 100 communicates with a node 202 within the wireless network 200. The node 202 may be configured in accordance with GPRS and GSM technologies. The node 202 may include a base station controller (BSC) 204 with an associated tower station 206, a Packet Control Unit (PCU) 208 added for GPRS support in GSM, a Mobile Switching Center (MSC) 210, an HLR 212, a VLR 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that may be commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 may be a fixed transceiver station in which case the station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all subscriber identities registered with a specific network, permanent configuration data such as a user profile, IMSI, MSISDN, and the like, may be stored in the HLR 212. The HLR 212 may also contain location information for each mobile device using a registered subscriber identity and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote node of the HLR 212 to the VLR 214, the amount of traffic between these nodes can be reduced so that voice and data services can be provided with faster response times while at the same time using less computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 typically performs a "GPRS Attach" to acquire an IP address and to access data services. This would not typically be present in circuit switched voice channels as Integrated Services Digital Network (ISDN) addresses are used for routing incoming and outgoing calls. GPRS capable networks may use private, dynamically assigned IP addresses, and a DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

The host system 250 may be a corporate enterprise or other local area network (LAN), but may also be a home office computer or some other private system, for example, in variant embodiments. In some cases, the host system 250 may represent a smaller part of a larger network of an organization. Typically, mobile devices communicate wirelessly with the host system 250 through one or more of the nodes 202 of the wireless network 200. The host system 250 may include one or more routers and computing devices that may operate from behind a firewall or proxy server. The proxy server routes data to the correct destination server(s) within the host system 250. For instance, the host system 250 may include a message server to send and receive messages to the mobile devices and a message management server that controls when, if, and how messages are sent to the mobile devices. The host system 250 can also include other servers that provide various functions for the host system 250 as well as data stores or databases.

In some embodiments, host system 250 may comprise a subscriber identity server 290. Subscriber identity server 290 may comprise a processor, volatile and non-volatile memory, input-output interfaces (including at least one network interface) and various application modules. Application modules may include, for example, a notification module which may be notified when a mobile device connects to a visited network, a subscriber identity management module to manage available subscriber identities, and a communication management module to manage call and services forwarding (not shown). Subscriber identity server 290 may also have access to a subscriber identity database 295, which is configured to store a plurality of available subscriber identities to be used as described herein.

In some cases, the features and functionality of subscriber identity server 290 and subscriber identity database 295 may be integrated with other components of host system 250, such as the message server or message management server.

As noted above, the HLR is one type of database operated by wireless network service providers, which contains information regarding each subscriber identity authorized to use the wireless network. There may be several logical or physical HLRs for each wireless network. For example, several HLRs may be provided on computer servers physically distributed across a wireless network, but may be synchronized together to act as a single, logical HLR.

Subscriber information stored by the HLR includes the IMSI of each subscriber and may include at least one MSISDN number of the subscriber. The MSISDN is a number used to make and receive voice calls and text messages. Other information stored by the HLR typically includes data associated with subscribed services, current location of the subscriber (e.g., Location Area Code, last known VLR, current support node, etc.), and call diversion settings (e.g., call forwarding information) for each MSISDN.

To update the current location of the subscriber when the mobile device is operated in a new location area (either within the home network or otherwise), a Location Area update procedure may be followed. The subscriber information is first transmitted from the subscriber's HLR to the VLR or support node of the subscriber's new Location Area. Subsequently, the subscriber's HLR may communicate with the new VLR to establish how incoming communications are to be delivered to the mobile device. Finally, the subscriber's HLR may notify a previous VLR that the subscriber is in a new location area, and that the subscriber information (which was previously retrieved and stored in a similar manner) can be removed by the previous VLR.

Generally, the VLR is a database identifying subscriber information for mobile devices in the location area served by a MSC. Typically, each wireless base station in a network is served by only one VLR. To ensure that communications can be accurately delivered at all times, wireless networks will attempt to maintain subscriber information at only one VLR at a time (i.e., at the VLR serving the location area in which the subscriber's mobile device is connected).

The VLR may store subscriber information received from an HLR, or from the mobile device itself. Subscriber information stored by the VLR may include IMSI or Temporary Mobile Subscriber Identity (TMSI), authentication data, MSISDN, subscribed services, and the subscriber's home HLR identifier.

Subscriber information may be removed from the VLR upon receiving a notification that the subscriber has left the location area served by the VLR, or after a predetermined inactivity period.

As noted above, service providers typically store a permanent subscriber identity record in an HLR. In order to provide services to a mobile device outside of its home network (i.e., to facilitate roaming functions), a temporary subscriber identity may also be stored by the visited network, typically for as long as the mobile device is present in the visited network. Accordingly, a home network and visited network for a particular subscriber can be defined, and a determination of whether the mobile device is in its home network or a visited network can be made based on the existence or type of subscriber identity recorded in the HLR of a network.

When a subscriber's mobile device first connects to a visited network, it may attempt to use roaming functionality. If there is no entry for the subscriber in the HLR of the visited network, the required subscriber identity record can be requested by the visited network, for example from the subscriber's home network. Thereafter, a temporary subscriber identity can be stored in a Visitor Location Register (VLR) of the visited network.

The specific details of the roaming process may differ based on the type of cellular network, however generally the roaming process begins with a mobile device connecting to a visited network for the first time, either because the mobile device has been powered on, or has been "handed off" to the visited network by another network (in mobile communications, the term "handover" or "handoff" refers to the process of transferring an ongoing call or data session from one channel, cell, or network to another). The mobile device detects that it is not connected to its home network and may attempt to contact its home network.

The visited network may detect that the mobile device does not have a known subscriber identity in its own HLR, and may contact the home network of the mobile device's subscriber identity (i.e., the subscriber's home network) to request subscriber identity data and service information (including whether the mobile device should be allowed to make use of roaming functionality). Typically, the request specifies the IMSI of the mobile device.

If a response is received from the subscriber's home network that authorizes the mobile device to make use of roaming, the visited network may create a temporary subscriber record for the device. The home network of the subscriber may also record that the mobile device is connected to the visited network, so that any data addressed to the mobile device can be routed correctly.

For example, if an incoming voice call is directed to a mobile device using roaming functionality, the incoming call may first be directed by the public switched telephone network to the home network of the mobile device, and then the home network may re-route the call to the mobile device on the visited network.

Generally, for a subscriber to be allowed to operate in a roaming mode on a visited network, a roaming agreement between the service providers of the home network and visited network is in place.

Roaming agreements typically specify billing procedures and costs. Generally, the cost for accessing network services in a visited network are higher than when those same network services are accessed in a subscriber's home network. Thus, subscribers may prefer to avoid or minimize the use of network services when operating a mobile device on a visited network.

Types of Roaming

The preceding description describes a traditional form of roaming, which may be further categorized as either "international roaming" or "national roaming".

International roaming and national roaming are largely similar. Both provide the ability for a subscriber to move from one wireless network to another. In the case of international roaming, the wireless networks traversed may be in different countries. In the case of national roaming, the wireless networks may be in the same country, but operated by different wireless network service providers. In some cases, the wireless networks may be physically distinct, although this need not be the case.

The term "roaming" may also be used informally to refer to the use of network services outside of a "local" area in a single wireless network. This "regional roaming" is generally found where network service, or the cost thereof, is differentiated regionally within a single wireless network. For example, service providers may define "local" and "roaming" calling areas for subscribers, where the "local" area for a particular subscriber may be determined geographically based on the subscriber's home address (or telephone number). In this case, the subscriber may be considered to be "roaming" when leaving the geographically defined "local" calling area. The local calling area may be thus defined logically, or based on business rules, rather than any physical or technical requirements of the particular wireless network. Generally, the subdivisions of the network may be based on Location Areas within the network, with each Location Area having an LAI or Location Area Code (LAC) number.

The term "home zone" is defined herein as a "home network" in the international or national roaming scenario, and as a "local" Location Area in the case of regional roaming.

Correspondingly, the term "visited zone" is defined herein as a "visited network" (i.e., a network other than the home network associated with the primary subscriber identity) in the international or national roaming scenario, and as a "non-local" Location Area (i.e., other than the subscriber's "local" area) in the case of regional roaming.

As used herein, the term "zone" refers to a network or some portion of a network, rather than a geographical area. It will be appreciated that, in some cases, a network zone nevertheless may be closely correlated with a geographical area served by the network. For example, a Location Area within a network is generally closely correlated to the geographical area containing the cellular base stations that make up the Location Area.

Generally, the cost associated with network services used while in a visited zone will be higher than when within the home zone.

Many enterprises provide and support a plurality of mobile devices for use by their employees. Some of these employees may wish to travel outside of their home networks for business or personal reasons. However, due to the higher costs associated with the use of mobile devices in a visited zone, the enterprise may incur higher costs when these employees use their mobile devices while travelling.

To reduce costs, some enterprises maintain a physical pool of "roaming" SIM cards registered to various wireless networks. When an employee knows in advance that he will be visiting a specific region serviced by a particular service provider, then a suitable "roaming" SIM card (e.g., one that is registered to the service provider that operates the wireless network in the region to be visited) can be borrowed from the pool. Accordingly, the employee can physically replace the original SIM card in his mobile device with the roaming SIM card while away, to reduce the cost of using wireless network services.

However, managing such a pool of roaming SIM cards can be inconvenient and impose other costs. For example, employees may not know in advance which networks they will need to use while traveling. Shipment of SIM cards can be costly, and there may be other costs incurred due to lost SIM cards and the like.

Described herein are some example embodiments of systems and methods for managing a pool of subscriber identities that can be dynamically assigned to a mobile device over a network.

In the example of international roaming, when a subscriber's mobile device connects to a visited network, a subscriber identity server (e.g., a message management server associated with the enterprise or the subscriber's home network) can be notified. The subscriber identity server may have access to a plurality of available subscriber identities (e.g., registered with service providers in various countries), and may select a suitable subscriber identity for which the subscriber's visited network is a home network. For example, if the subscriber's home network is "A-Mobile" in Germany and the subscriber's mobile device is connected to the "Green" network in the United Kingdom, then a subscriber identity that is registered to the "Green" network in the United Kingdom may be selected as the temporary subscriber identity.

The selected subscriber identity can be communicated to the subscriber's mobile device, which can store the new, temporary subscriber identity in a programmable module (e.g., programmable SIM, flash memory, etc.) at the subscriber's mobile device. Subsequently, the new, temporary subscriber identity can be used in place of the original, primary subscriber identity on the mobile device, thus allowing the subscriber to avoid making use of roaming services.

Optionally, as part of the subscriber identity change, the subscriber identity server can configure the subscriber's original HLR to forward calls to the temporary subscriber identity at the mobile device (or, in some cases, to the mobile device itself), to ensure that incoming calls and data communications directed to the primary subscriber identity can still be received while using the temporary subscriber identity.

In cases where the original subscriber identity is deleted or overwritten at the mobile device when a temporary subscriber identity is stored, the original subscriber identity can be restored when the subscriber once again connects to the original home network (e.g., by replacing the temporary subscriber identity with the original subscriber identity).

Subscriber identities managed by the subscriber identity server can be purchased and/or registered in advance or as-needed with various network service providers.

In some cases, subscriber information may be copied from existing physical SIM cards using a reader device, to create subscriber identities managed by the subscriber identity server.

A similar process may be used in the case of regional roaming (e.g., within the same wireless network), whereby the temporary subscriber identity may be selected based on the current location area of the subscriber's mobile device. For example, if a subscriber's local calling area is New York and the subscriber's mobile device is connected to the same wireless network in Los Angeles, then a temporary subscriber identity that has a local calling area of Los Angeles may be selected.

Connectivity Scenarios

Figure 4A:
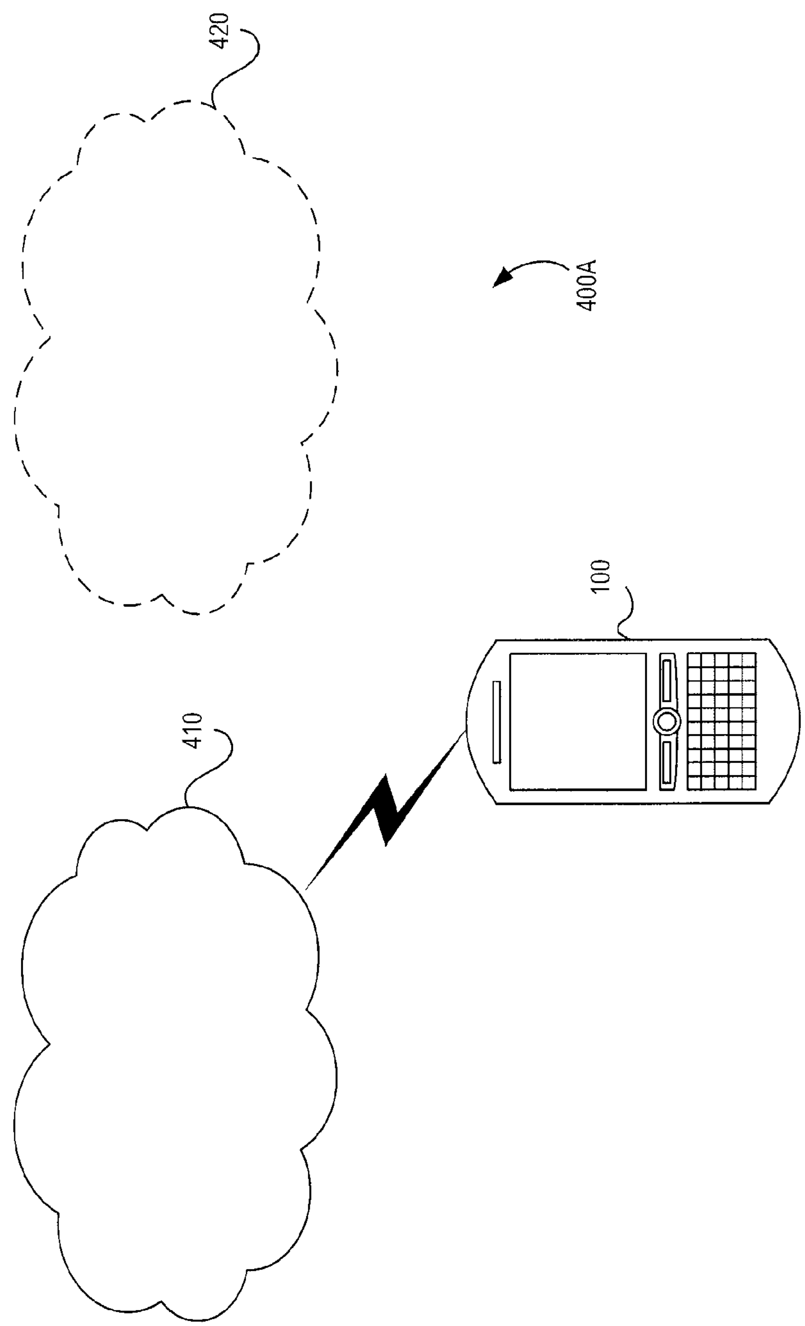
FIGS. 4A to 4C are system diagrams illustrating example connectivity scenarios for a mobile device.
Figure 4B:
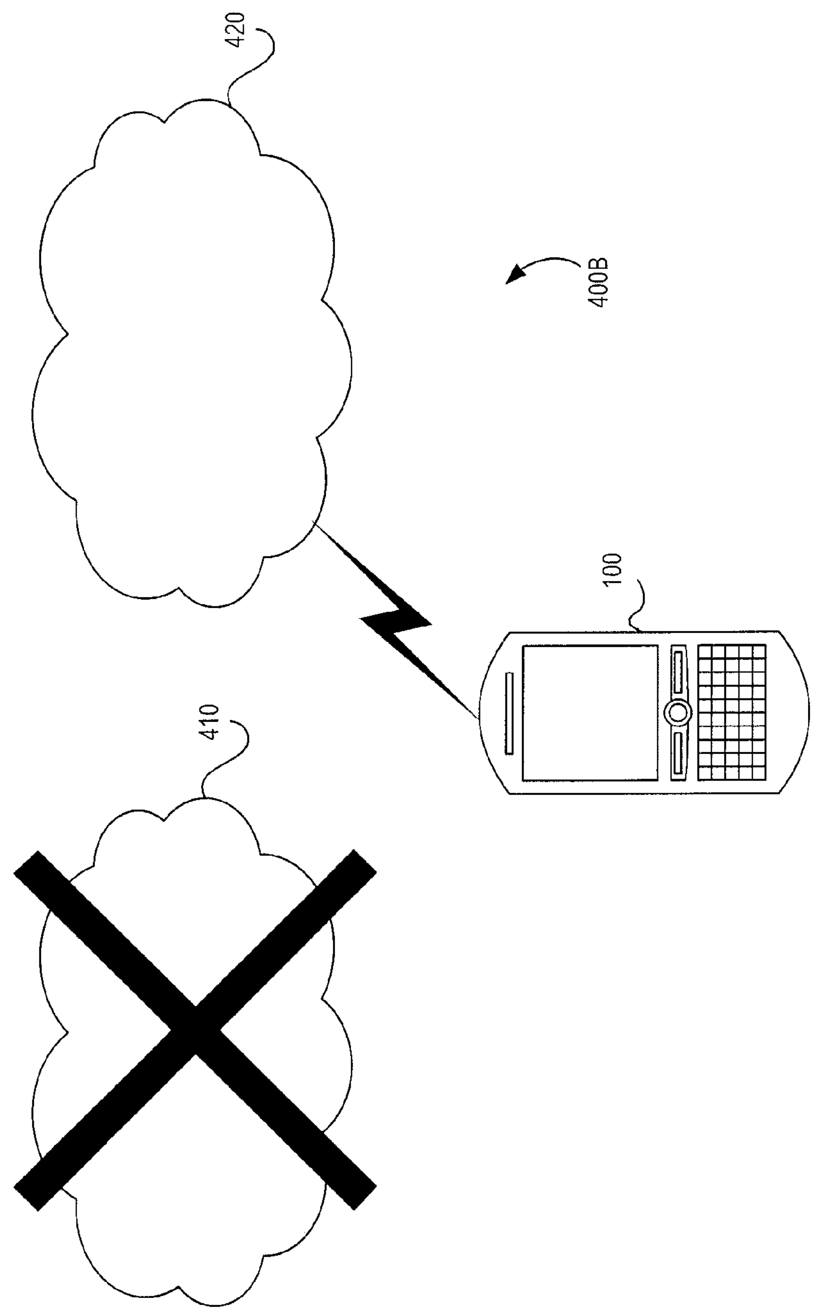
Figure 4C:
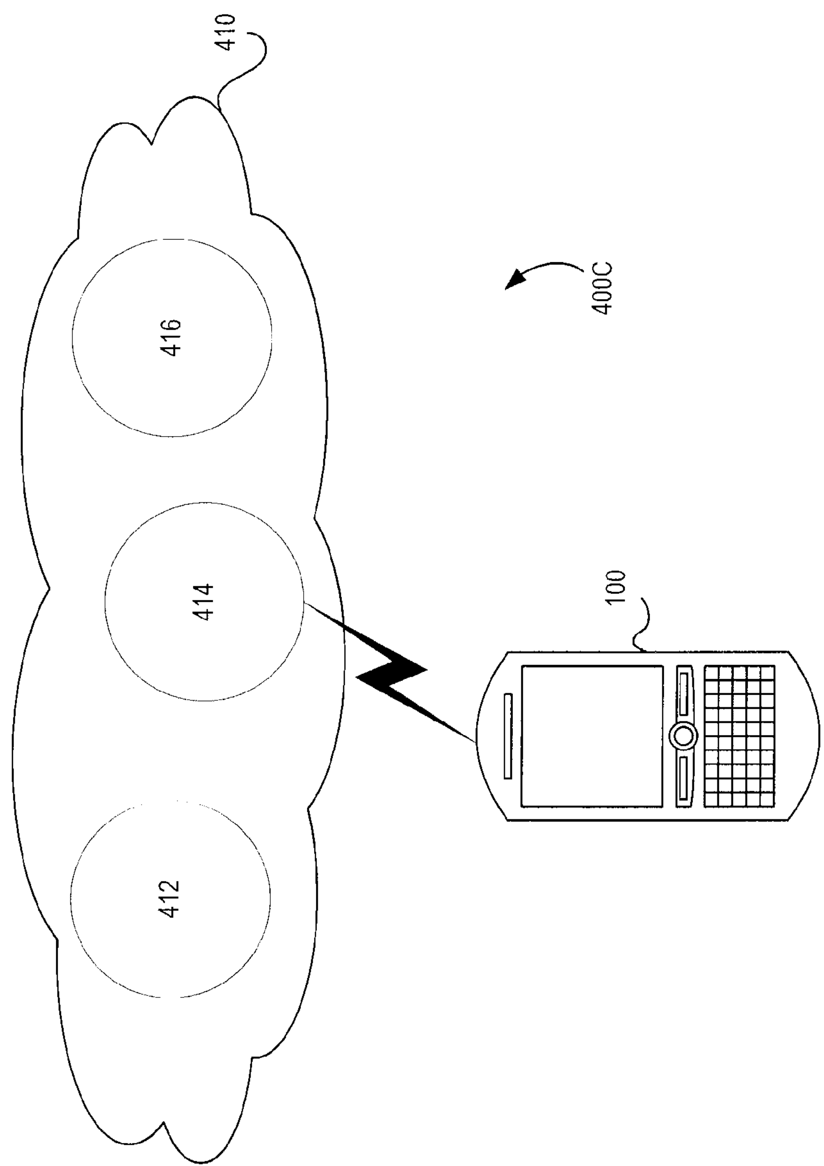

Referring now to FIGS. 4A to 4C, there are shown system block diagrams illustrating example connectivity scenarios for a mobile device.

1—No Roaming

In connectivity scenario 400A, mobile device 100 is connected to home network 410, which is the home network of the subscriber identity currently used by mobile device 100. In this scenario, the home network is the home zone of the primary subscriber identity used by mobile device 100, and visited network 420 is the visited zone. Visited network 420 is not presently accessible to, or within range of, mobile device 100.

Accordingly, in connectivity scenario 400A, mobile device 100 does not make use of roaming functionality.

2—International/National Roaming

As in connectivity scenario 400A, in connectivity scenario 400B, the home network 410 is the home zone of the primary subscriber identity used by mobile device 100, and visited network 420 is the visited zone.

In connectivity scenario 400B, home network 410 is no longer accessible to mobile device 100 (e.g., because the mobile device is physically out of range). However, visited network 420 is accessible to mobile device 100, and mobile device 100 attempts to connect to visited network 420.

3—Regional Roaming

In contrast to connectivity scenarios 400A and 400B, in connectivity scenario 400C, mobile device 100 can stay connected only to home network 410. Home network 410 has a plurality of location areas 412, 414 and 416. However, location area 412 is defined as the "local" area of mobile device 100 and is thus the home zone of the primary subscriber identity used by mobile device 100, while location areas 414 and 416 comprise the visited zone(s).

Mobile device 100 is shown connected to network 410 in a location area 414 (i.e., in the visited zone). Accordingly, mobile device 100 may be considered to be roaming regionally within the home network 410.

Managing Identities

Figure 5:
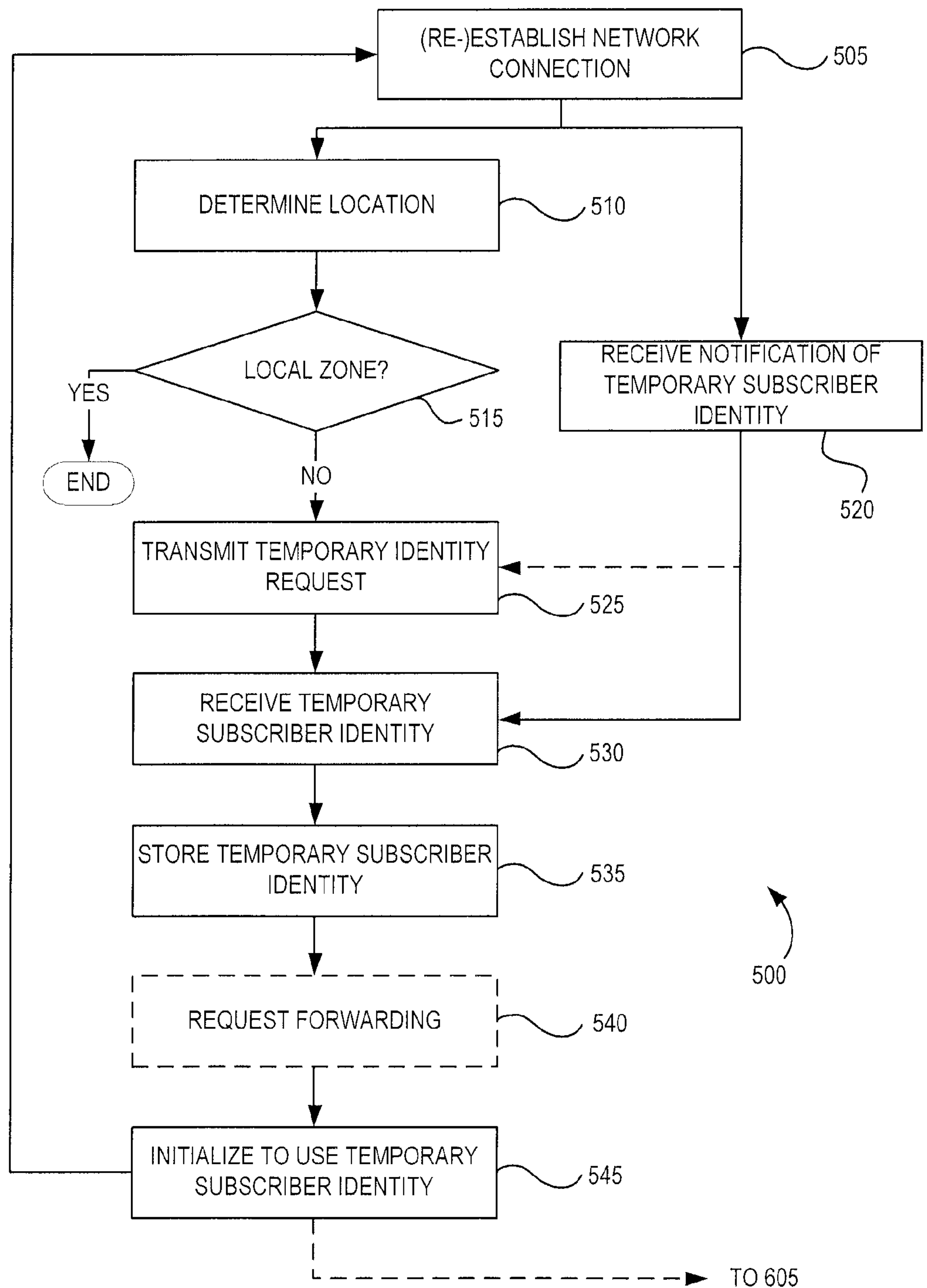
FIG. 5 is a flowchart diagram for an example method of managing subscriber identity at a mobile device.

Referring now to FIG. 5, there is shown a flowchart diagram for an example method of managing subscriber identities at a mobile device.

Method 500 begins at 505, with a mobile device, such as mobile device 100 of FIG. 1, establishing or re-establishing a connection to a wireless network, such as network 200 of FIG. 2.

In some embodiments, the mobile device may determine its current location at 510. Location may be determined based on a property of the network 200 to which mobile device is connected, such as the HNI or LAI. In some cases, location may be determined using wireless location techniques, such as GPS or Assisted GPS (A-GPS).

At 515, the mobile device may determine whether its current location corresponds to a home zone or a visited zone for its current subscriber identity (e.g., a primary subscriber identity, which may also correspond to a temporary subscriber identity previously assigned to the mobile device).

As described herein, a home zone may be a home network associated with the primary subscriber identity of the mobile device, or a "local" location area within the home network. Correspondingly, a visited zone may be a visited network, or a "non-local" location area within the home network.

If the current location is in the home zone (i.e., home network or local location area) associated with the primary subscriber identity, then method 500 ends.

If, based on the primary subscriber identity, the current location is in a visited zone (i.e., visited network or non-local location area), mobile device may transmit a temporary identity request to a subscriber identity server, such as subscriber identity server 290 of FIG. 3, at 525.

In response to the request, the mobile device may receive a temporary subscriber identity from the subscriber identity server at 530.

In some embodiments, the mobile device may not perform acts 510 and 515, and may instead receive a notification that a temporary subscriber identity is available, at 520. In such cases, the mobile device may optionally transmit the temporary identity request at 525, or may simply receive the temporary subscriber identity at 530.

Generally, the temporary subscriber identity is selected based on the current location of the mobile device. More particularly, the temporary subscriber identity can be selected so that the current location of the mobile device is within the home zone (i.e., home network or local calling area) associated with the temporary subscriber identity.

At 535, the mobile device stores the temporary subscriber identity and the respective subscriber information associated with the identity (e.g., IMSI, MSISDN, etc.). The temporary subscriber identity may be stored in a programmable SIM card (e.g., SIM/RUIM 126 of FIG. 1), in a memory (e.g., memory 108 of FIG. 1), or in programmable identity module 160 of FIG. 1. In some cases, the programmable SIM supports concurrent storage of a plurality of identities. In some cases, the temporary subscriber identity may replace the primary subscriber identity in the memory or programmable SIM card or identity module. In other cases, the temporary subscriber identity may be stored in a secondary programmable SIM/RUIM or in programmable identity module 160. If more than one subscriber identity is stored concurrently at the mobile device, a user interface may be provided for selecting between identities. Alternatively, mobile device may automatically select a suitable subscriber identity based on the network or location area to which it is connected. That is, mobile device may automatically select a subscriber identity such that the home zone associated with the selected subscriber identity corresponds to the current location.

Optionally, at 540, the mobile device may transmit a forwarding request, for example to the host system, HLR or other router associated with the primary subscriber identity, to forward incoming calls and other communications to the temporary subscriber identity (or, in some cases, to the mobile device itself).

At 545, the mobile device may initialize itself to use the temporary subscriber identity. Initialization may comprise rebooting the device, or simply re-connecting to the network using the temporary subscriber identity at 505.

At a later time, method 500 may optionally continue to 605 of FIG. 6, which will be described presently.

Figure 6:
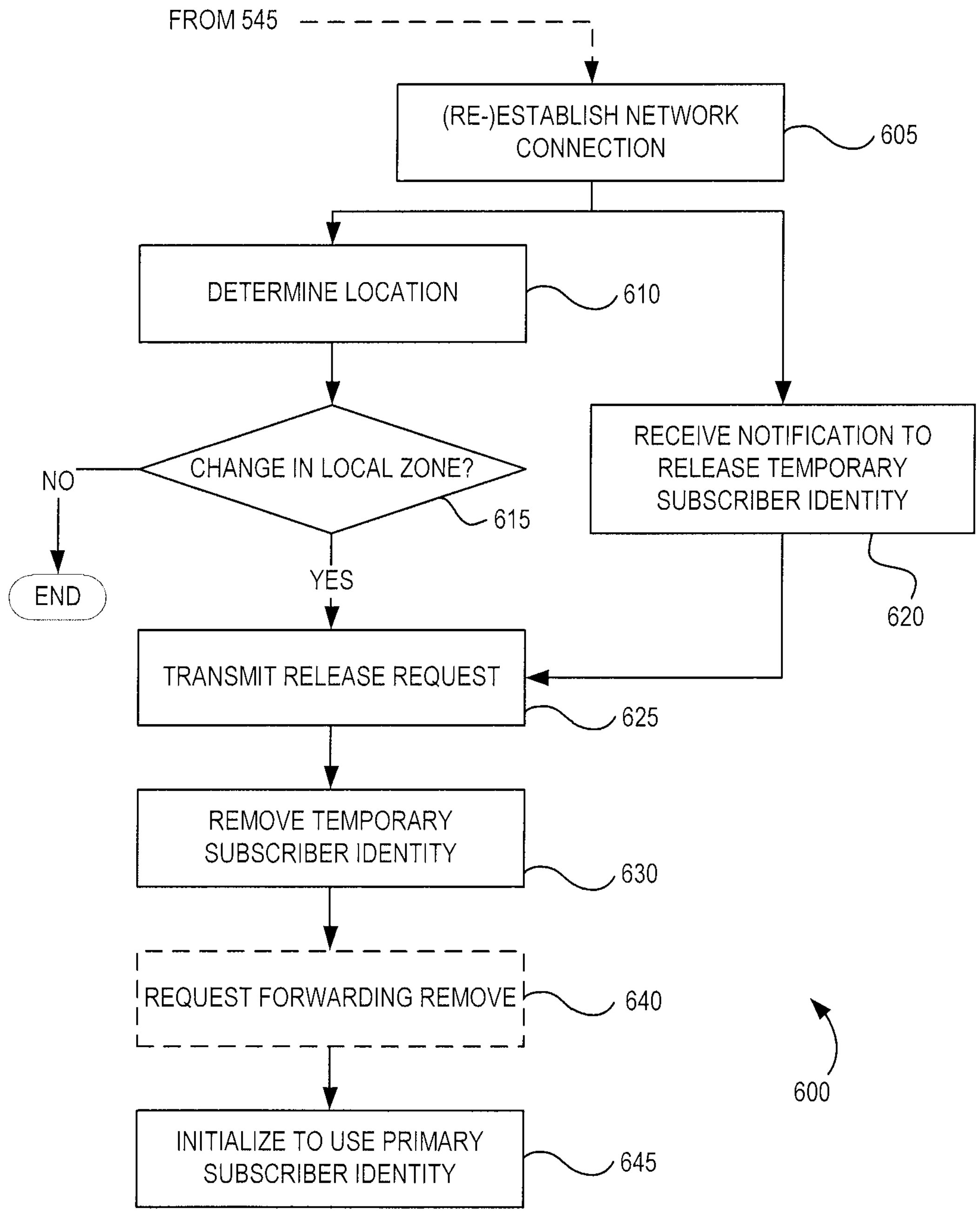
FIG. 6 is a continuation of the flowchart diagram of FIG. 5.

Referring now to FIG. 6, there is shown a flowchart diagram for a further method of managing subscriber identity of FIG. 5, in which a temporary subscriber identity can be released by a mobile device and the primary subscriber identity restored.

Method 600 may be performed when a mobile device has a temporary subscriber identity that was previously assigned (e.g., using method 500 of FIG. 5) and which is currently stored or in use by the mobile device. Method 600 begins at 605, with a mobile device, such as mobile device 100, establishing or re-establishing a connection to a wireless network, such as network 200.

In some embodiments, the mobile device may determine its location at 610, which may be performed in similar fashion as at 510 of method 500.

At 615, the mobile device may determine whether its current location corresponds to the home zone associated with the primary subscriber identity or a visited zone.

If the current location is in the home zone associated with the temporary subscriber identity, then method 600 may end.

If the current location is in a different visited zone, such that the home zone associated with the temporary subscriber identity differs from the zone at the current location, or if the current location is in the home zone associated with the primary subscriber identity, then the mobile device may transmit an identity release request to a subscriber identity server, such as subscriber identity server 290 of FIG. 3, at 625. The identity release request may identify the temporary subscriber identity, for example, by IMSI.

In some embodiments, the mobile device may not perform acts 610, 615 and 625, and may instead receive a notification comprising instructions to release the temporary subscriber identity and resume using the primary subscriber identity, at 620. In such cases, the mobile device may optionally transmit the identity release request at 625, or may simply resume using the primary subscriber identity, if it is stored locally at the mobile device.

At 630, the memory or programmable SIM or identity module at the mobile device can be reprogrammed to remove the temporary subscriber identity, and another subscriber identity (e.g., the primary subscriber identity) can be stored instead.

Optionally, if forwarding was configured at 540 of method 500, then a remove forwarding request can be transmitted at 640.

At 645, the mobile device may initialize itself to use the primary subscriber identity. Initialization may comprise rebooting the device, or simply re-connecting to the network using the primary subscriber identity.

Figure 7:
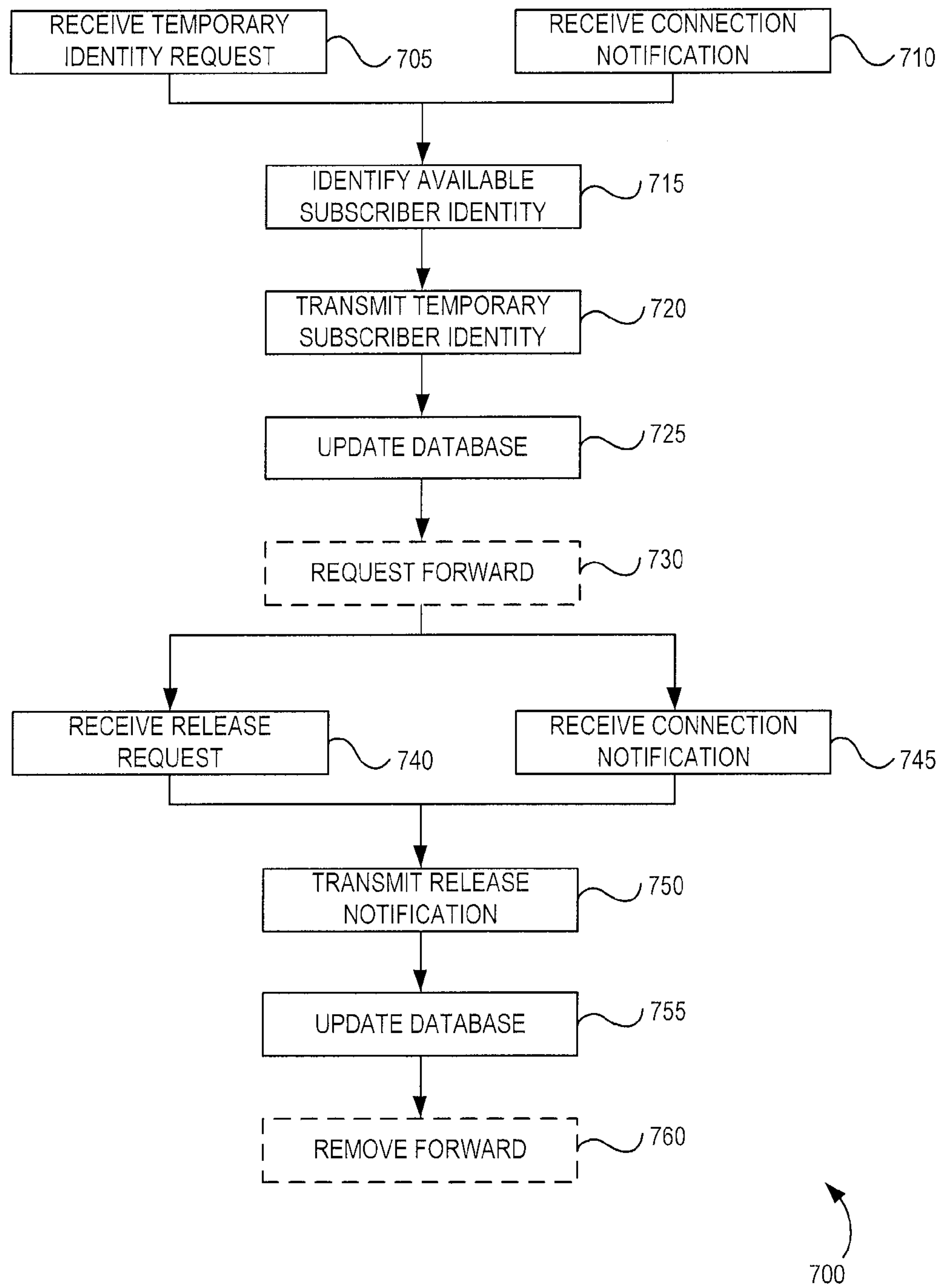
FIG. 7 is a flowchart diagram for an example method of managing subscriber identity at a subscriber identity server.

Referring now to FIG. 7, there is shown a flowchart diagram for an example method of managing subscriber identities at a subscriber identity server. The subscriber identity server may manage subscriber identities for at least one mobile device, and may manage identities for a plurality of mobile devices.

Method 700 may begin at 705 or 710, with a subscriber identity server—such as subscriber identity server 290—determining that the mobile device is connected in a visited zone other than a home zone associated with the primary subscriber identity of a mobile device. At 705, the subscriber identity server receives a temporary identity request from the mobile device identifying the current location. Alternatively (or additionally), at 710, the subscriber identity server receives a notification that the mobile device, which is managed by the subscriber identity server, has connected to a network in a visited zone (i.e., a visited network or non-local area based on its current, primary subscriber identity).

At 715, the subscriber identity server selects an available temporary subscriber identity from a plurality of available subscriber identities in a subscriber identity database or pool, such as database 295 of FIG. 3. Selection of the temporary subscriber identity entails selecting the subscriber information (e.g., IMSI, MSISDN, etc.) that makes up the temporary subscriber identity (i.e., not a physical SIM card that stores the identity).

The temporary subscriber identity may be selected such that the home zone associated with the temporary subscriber identity corresponds to the current location of the mobile device.

If more than one suitable temporary subscriber identity is available, the subscriber identity server may select the subscriber identity based on predefined selection criteria. Predefined selection criteria may include the least recent "last used" date, lowest billing costs associated with the temporary subscriber identity, previous use (e.g., has the subscriber used the temporary subscriber identity before), or combinations thereof. If no suitable temporary subscriber identity is available, the subscriber identity server may return an error message, or discontinue method 700.

At 720, the selected temporary subscriber identity can be transmitted to the mobile device and, at 725, the database may be updated to indicate that the selected temporary subscriber identity is in use. The database may also be updated to record the subscriber using the temporary subscriber identity, the subscriber's primary subscriber identity, the current date and time, and combinations thereof.

Optionally, at 730, the subscriber identity server may transmit a forwarding request, for example to the host system, HLR or other router associated with the primary subscriber identity, to forward incoming calls and other communications to the temporary subscriber identity (or, in some cases, to the mobile device itself).

The mobile device may be programmed to use the temporary subscriber identity, as described with reference to method 500 FIG. 5.

Likewise, the mobile device may perform method 600 of FIG. 6 upon entering a different zone.

Accordingly, at 740 or 745, the subscriber identity server receives a notification that the mobile device has changed zones. At 740, the subscriber identity server may receive an identity release request from the mobile device identifying the temporary subscriber identity to be released. Alternatively (or additionally), at 745 the subscriber identity server may receive a notification that the mobile device has changed zones, for example by connecting to a new visited network, returning to the home network of the primary subscriber identity, or entering a new location area within the network.

At 750, the subscriber identity server may transmit a notification to the mobile device comprising instructions to release the temporary subscriber entity and resume using the primary subscriber entity. Resuming use of the primary subscriber identity may comprise reprogramming a memory, SIM or programmable identity module with the primary subscriber identity, which in some cases may be retrieved over the network from the subscriber identity server, for example.

At 755, the database may be updated to indicate that the temporary subscriber identity is once again available for use by other mobile devices, if desired. The database may also be updated to indicate the current date and time that the temporary subscriber identity was released and made available. In some cases, the database may be updated to indicate a "waiting period" before the temporary subscriber identity is made available. This may avoid or reduce the incidence of communications being directed to a subsequent subscriber by an individual or device that is unaware that the temporary subscriber identity is no longer in use by an earlier user.

Optionally, if forwarding was configured at 730 of method 700, then a remove forwarding request can be transmitted at 760.

It should be understood that various modifications can be made to the embodiments described and illustrated herein, without departing from the embodiments, the general scope of which is defined in the appended claims.

The invention claimed is:

1. A method for managing subscriber identities on a mobile device during regional roaming, the mobile device having a primary subscriber identity associated therewith, the primary subscriber identity being associated with a first location area in a home network, the method comprising:

wirelessly receiving a temporary subscriber identity from a subscriber identity server while the mobile device is located in a second location area in the home network, the second location area having a different Location Area Code than the first location area;

storing the temporary subscriber identity in a memory of the mobile device; and initializing the mobile device to use the temporary subscriber identity.

2. The method of claim 1, further comprising:

prior to receiving the temporary subscriber identity, detecting that the mobile device is located in the second location area; and in response to the detecting, transmitting a temporary identity request to the subscriber identity server, the temporary identity request comprising an indication of the second location area.

3. The method of claim 1, further comprising, prior to initializing the mobile device to use the temporary subscriber identity, transmitting a request to a host system to forward communications addressed to the primary subscriber identity to the temporary subscriber identity.

4. The method of claim 1, further comprising:

detecting that the mobile device has changed its location from the second location area to the first location area;

transmitting a release request to the subscriber identity server to release the temporary subscriber identity; and re-initializing the mobile device to use the primary subscriber identity.

5. The method of claim 1, wherein the memory is a programmable subscriber identity module provided on the mobile device.

6. A method at a subscriber identity server for managing identity of a mobile device during regional roaming, wherein the mobile device has a primary subscriber identity associated therewith, the primary subscriber identity being associated with a first location area in a home network, the method comprising:

determining that the mobile device is located in a second location area in the home network, the second location area having a different Location Area Code than the first location area;

selecting a temporary subscriber identity from a plurality of available identities, wherein the selected temporary subscriber identity is associated with the second location area; and transmitting the selected temporary subscriber identity to the mobile device.

7. The method of claim 6, wherein the determining comprises receiving a temporary identity request from the mobile device, the temporary identity request comprising an indication of the second location area.

8. The method of claim 6, further comprising transmitting a request to a host system to forward communications addressed to the primary subscriber identity to the temporary subscriber identity.

9. The method of claim 6, further comprising updating a database to indicate that the temporary subscriber identity has been assigned to the mobile device.

10. The method of claim 9, further comprising:

receiving a notification that the mobile device has changed location; and updating the database to indicate that the temporary subscriber identity is no longer assigned to the mobile device.

11. A mobile device having a primary subscriber identity associated therewith, the primary subscriber identity being associated with a first location area in a home network, the mobile device comprising:

a memory;

a communication subsystem configured to wirelessly receive a temporary subscriber identity from a subscriber identity server while the mobile device is located in a second location area in the home network during regional roaming, the second location area having a different Location Area Code than the first location area;

a processor configured to:

store the temporary subscriber identity in the memory of the mobile device; and initialize the mobile device to use the temporary subscriber identity.

12. The mobile device of claim 11, wherein the mobile device is configured to:

prior to receiving the temporary subscriber identity, detect that the mobile device is located in the second location area; and in response to the detecting, transmit a temporary identity request to the subscriber identity server, the temporary identity request comprising an indication of the second location area.

13. The mobile device of claim 11, wherein the mobile device is configured to:

prior to initializing the mobile device to use the temporary subscriber identity, transmit a request to a host system to forward communications addressed to the primary subscriber identity to the temporary subscriber identity.

14. The mobile device of claim 11, wherein the mobile device is configured to:

detect that the mobile device has changed its location from the second location area to the first location area;

transmit a release request to the subscriber identity server to release the temporary subscriber identity; and re-initialize the mobile device to use the primary subscriber identity.

15. The mobile device of claim 11, wherein the memory is a programmable subscriber identity module provided on the mobile device.

16. An apparatus for managing identity of a mobile device during regional roaming, wherein the mobile device has a primary subscriber identity associated therewith, the primary subscriber identity being associated with a first location area in a home network, the apparatus comprising:

a database configured to store a plurality of available identities;

a processor configured to:

determine that the mobile device is located in a second location area in the home network, the second location area having a different Location Area Code than the first location area;

select a temporary subscriber identity from the plurality of available identities, wherein the selected temporary subscriber identity is associated with the second location area; and transmit the selected temporary subscriber identity to the mobile device.

17. The apparatus of claim 16, wherein the determining comprises receiving a temporary identity request from the mobile device, the temporary identity request comprising an indication of the second location area.

18. The apparatus of claim 16, wherein the apparatus is configured to transmit a request to a host system to forward communications addressed to the primary subscriber identity to the temporary subscriber identity.

19. The apparatus of claim 16, wherein the apparatus is configured to update a database to indicate that the temporary subscriber identity has been assigned to the mobile device.

20. The apparatus of claim 19, wherein the apparatus is configured to:

receive a notification that the mobile device has changed location; and update the database to indicate that the temporary subscriber identity is no longer assigned to the mobile device.

* * * * *